US008521428B1

(12) United States Patent
Liccardo et al.

(10) Patent No.: US 8,521,428 B1
(45) Date of Patent: Aug. 27, 2013

(54) HEADING DETERMINATION USING SENSORS MOUNTED ON ROTATABLE ASSEMBLY

(75) Inventors: Darren S. Liccardo, San Jose, CA (US); John J. James, Felton, CA (US); Walter K. Stockwell, Sunnyvale, CA (US); Michael A. Horton, Mountain View, CA (US)

(73) Assignee: Moog Inc., East Aurora, NY (US)

( * ) Notice: Subject to any disclaimer, the term of this patent is extended or adjusted under 35 U.S.C. 154(b) by 954 days.

(21) Appl. No.: 12/579,879

(22) Filed: Oct. 15, 2009

(51) Int. Cl.
*G01C 21/18* (2006.01)

(52) U.S. Cl.
USPC .......... 701/511; 701/519; 73/1.77; 73/1.78; 702/151; 702/153

(58) Field of Classification Search
USPC .......... 701/1, 3, 4, 500, 501, 504, 510, 511, 701/518, 519; 702/150–153; 73/1.75, 1.77, 73/1.78
See application file for complete search history.

(56) References Cited

U.S. PATENT DOCUMENTS

| | | | |
|---|---|---|---|
| 4,002,886 A | 1/1977 | Sundelin | |
| 4,418,333 A | 11/1983 | Schwarzbach et al. | |
| 4,766,295 A | 8/1988 | Davis et al. | |
| 5,352,957 A | 10/1994 | Werner | |
| 5,365,154 A | 11/1994 | Schneider et al. | |
| 5,640,151 A | 6/1997 | Reis et al. | |
| 5,697,061 A | 12/1997 | Krueger et al. | |
| 5,841,365 A | 11/1998 | Rimkus | |
| 5,995,015 A | 11/1999 | DeTemple et al. | |
| 6,032,109 A | 2/2000 | Ritmiller, III | |
| 6,078,269 A | 6/2000 | Markwell et al. | |
| 6,208,247 B1 | 3/2001 | Agre et al. | |
| 6,243,654 B1 | 6/2001 | Johnson et al. | |
| 6,381,467 B1 | 4/2002 | Hill et al. | |
| 6,392,562 B1 | 5/2002 | Boston et al. | |
| 6,459,990 B1 * | 10/2002 | McCall et al. | 701/501 |
| 6,577,952 B2 * | 6/2003 | Geier et al. | 701/446 |

(Continued)

OTHER PUBLICATIONS

IEEE Instrumentation and Measurement Society, "IEEE Standard for a Smart Transducer Interface for Sensors and Actuators—Transducers to Microprocessor Communication Protocols and Transducers Electronic Data Sheet (TEDS) Formats", IEEE Std. 1451.2-1997.

(Continued)

*Primary Examiner* — Thomas Black
*Assistant Examiner* — Ce Li
(74) *Attorney, Agent, or Firm* — Hodgson Russ LLP

(57) ABSTRACT

A system and method for more accurately and robustly determining the heading of a vehicle by taking measurements of angle rates using rate sensors mounted on a movable mechanical assembly. In a quasi-static state of the vehicle, the mechanical assembly is rotated around axes perpendicular to the tangent plane of the Earth, and angle rates are measured by the rate sensors at different rotational angles of the mechanical assembly. The measurements of the angle rates are then computed to determine the initial heading of the vehicle relative to the true north of the Earth in the quasi-static state of the vehicle. After determining the initial heading, navigation state propagation is performed to determine the heading of the vehicle in non-quasi-static state of the vehicle. By taking measurements of the rate sensors at different rotation angles and performing computation, the heading of the vehicle relative to the Earth's true north can be determined using less accurate angle sensors.

17 Claims, 5 Drawing Sheets

(56) References Cited

U.S. PATENT DOCUMENTS

| | | |
|---|---|---|
| 6,587,739 B1 | 7/2003 | Abrams et al. |
| 6,690,289 B1 | 2/2004 | Odinak et al. |
| 6,745,027 B2 | 6/2004 | Twitchell, Jr. |
| 6,749,116 B2 | 6/2004 | Massaro |
| 6,750,769 B1 | 6/2004 | Smith |
| 6,822,568 B2 | 11/2004 | Gehlot et al. |
| 6,844,821 B2 | 1/2005 | Swartzel et al. |
| 6,859,831 B1 | 2/2005 | Gelvin et al. |
| 6,961,709 B2 | 11/2005 | Goodwin, III |
| 7,035,240 B1 | 4/2006 | Balakrishnan et al. |
| 7,090,125 B2 | 8/2006 | Goel et al. |
| 7,103,511 B2 | 9/2006 | Petite |
| 7,152,040 B1 | 12/2006 | Hawthorne et al. |
| 7,176,808 B1 | 2/2007 | Broad et al. |
| 7,216,055 B1* | 5/2007 | Horton et al. ............ 702/153 |
| 7,231,180 B2 | 6/2007 | Benson et al. |
| 7,360,095 B2 | 4/2008 | Girouard et al. |
| 7,369,047 B2 | 5/2008 | Broad et al. |
| 7,397,368 B2 | 7/2008 | Otto et al. |
| 7,412,775 B1* | 8/2008 | Karnick et al. ............ 33/324 |
| 7,418,364 B1* | 8/2008 | Horton et al. ............ 702/153 |
| 7,424,527 B2 | 9/2008 | Petite |
| 7,429,936 B2 | 9/2008 | Paradiso et al. |
| 7,440,735 B2 | 10/2008 | Karschnia et al. |
| 7,512,493 B2* | 3/2009 | Morgan et al. ............ 701/510 |
| 7,526,402 B2* | 4/2009 | Tanenhaus et al. ........ 702/151 |
| 8,065,074 B1* | 11/2011 | Liccardo ............ 701/480 |
| 2001/0045128 A1* | 11/2001 | McCall et al. ............ 73/511 |
| 2002/0008661 A1* | 1/2002 | McCall et al. ............ 342/357.14 |
| 2002/0021245 A1* | 2/2002 | Lin et al. ............ 342/357.14 |
| 2002/0065626 A1* | 5/2002 | McCall et al. ............ 702/141 |
| 2003/0025599 A1 | 2/2003 | Monroe |
| 2003/0043028 A1 | 3/2003 | Torikai et al. |
| 2003/0063585 A1 | 4/2003 | Younis et al. |
| 2003/0149528 A1* | 8/2003 | Lin ............ 701/214 |
| 2004/0010492 A1 | 1/2004 | Zhao et al. |
| 2004/0098218 A1 | 5/2004 | Ito et al. |
| 2004/0122833 A1 | 6/2004 | Forth et al. |
| 2005/0090947 A1* | 4/2005 | Wise ............ 701/6 |
| 2005/0218218 A1 | 10/2005 | Koster |
| 2005/0237153 A1 | 10/2005 | Chen |
| 2005/0240347 A1* | 10/2005 | Yang ............ 701/220 |
| 2006/0130142 A1 | 6/2006 | Mester et al. |
| 2006/0176239 A1 | 8/2006 | Sweeney |
| 2006/0187040 A1 | 8/2006 | Sweeney |
| 2006/0220843 A1 | 10/2006 | Broad et al. |
| 2006/0229086 A1 | 10/2006 | Broad et al. |
| 2006/0265120 A1* | 11/2006 | Coleman et al. ............ 701/209 |
| 2006/0271667 A1 | 11/2006 | Clow et al. |
| 2007/0132846 A1 | 6/2007 | Broad et al. |
| 2007/0213933 A1* | 9/2007 | Zeng et al. ............ 701/220 |
| 2007/0291689 A1 | 12/2007 | Kapur et al. |
| 2008/0071480 A1* | 3/2008 | Lin ............ 702/35 |
| 2009/0048779 A1* | 2/2009 | Zeng et al. ............ 701/214 |
| 2009/0089001 A1* | 4/2009 | Lin ............ 702/92 |
| 2009/0119937 A1* | 5/2009 | Watson ............ 33/313 |
| 2010/0088063 A1* | 4/2010 | Laughlin ............ 702/151 |

OTHER PUBLICATIONS

IEEE Standards for a Smart Transducer Interface for Sensors and Actuators—Mixed-Mode Communication Protocols and Transducer Electronic Data Sheet (TEDS) Formats, IEEE Standards 1451.4-2004, IEEE Instrumentation and Measurement Society, 2004, 439 Pages.

Crossbow Technology, "Xmesh Network Layer," 2006, 1 page.

U.S. Appl. No. 11/930,832, filed Oct. 31, 2007, 38 Pages.

U.S. Appl. No. 11/152,350, filed Jun. 13, 2005, 33 Pages.

* cited by examiner

HEADING DETERMINATION USING SENSORS MOUNTED ON ROTATABLE ASSEMBLY

FIELD OF THE INVENTION

This invention relates to estimating the navigation state of accelerating bodies, more specifically to estimating attitude, heading and other navigational states using solid-state rate sensors.

BACKGROUND OF THE INVENTION

In a variety of navigation applications, it is necessary to determine the heading of an accelerating object. The heading of an object is the direction the object is pointing. For example, a robotic airplane may require heading information and other vehicle state information to point a camera at a target, navigate to a destination, and otherwise control its movement. Conventional systems measure heading using a traditional floating magnetic compass or strap-down magnetic vector sensor to measure the Earth's magnetic field. However, these sensors respond to any magnetic field. Thus, these sensors are subject to local magnetic disturbance. Many techniques exist for calibrating out local magnetic disturbance that is non-time variant with respect to the magnetic sensor reference frame. However, arbitrary time-varying magnetic disturbance is common and can cause significant heading measurement error. A typical example of a time-varying disturbance is a vehicle driving past a stationary magnetic sensor on a tripod.

True heading is heading determined with respect to the Earth's spin axis. True heading is used in navigation applications to geo-reference a map and account for accelerating inertial frame navigation corrections. To determine true north from a magnetic sensor requires a magnetic model of the Earth as a function of position and time. Such models are limited in accuracy because they do not account for local geographic mass distribution and cannot precisely predict the change to Earth's magnetic field in the future.

Alternatively, Global Navigation Satellite System (GNSS) such as the Global Positioning System (GPS), Galileo or GLONASS are used to calculate position and velocity of an object. Based on the position and velocity, a velocity track in an Earth-fixed reference frame can be derived. The velocity track represents the direction an object is moving, which is then assumed to be the direction an object is pointing. For precise navigation of ground or air vehicles, this assumption is incorrect. Therefore, the heading determined based on the GNSS systems tend to be inaccurate. Further, GNSS systems are also subject to jamming and poor reception of satellite signals, reducing the availability of a GNSS heading determination.

A gyro-compassing system is also used to determine true heading. The gyro-compassing system uses the Earth's rotational rate vector as a reference to directly determine true heading. Traditional gyro-compassing and north-finding systems are based on mechanical, Ring-Laser Gyro (RLG) or Fiber Optic Gyro (FOG) technologies. Because the Earth's rotational rate vector is unaffected by interference, gyro-compassing is highly reliable and self-contained. However, these systems are relatively large, heavy and expensive for man-portable or small robotic vehicle applications. Thus, deployment of the gyro-compassing system is generally limited to military vehicles, commercial aircrafts, and spacecrafts.

SUMMARY OF THE INVENTION

Embodiments relate to estimating heading of a vehicle in a dynamic state based on the initial heading of the vehicle determined in a quasi-static state by rotating an assembly that mounts a plurality of rate sensors and taking rate measurements from the plurality of rate sensors at different rotation angles of the assembly. At least first angular rate measurements and second angular rate measurement are taken and received from the plurality of rate sensors at a first time and a second time, respectively. The heading of the vehicle is maintained substantially the same at the first time and the second time. The initial heading of the vehicle is computed based on the first and second angular rate measurements. The heading of the vehicle in a dynamic state is computed based on the first heading responsive to receiving third angular rate measurements from the plurality of rate sensors.

In one embodiment, the heading of the vehicle is computed by propagating a state of the vehicle in time based on the first heading with discrete time increments.

In one embodiment, the estimated error of the heading of the vehicle in the dynamic state is computed by computing a state covariance of an Extended Kalman Filter based on a parameter representing characteristics of one or more of the plurality of rate sensors.

In one embodiment, initial heading is recomputed responsive to an estimated error of the third heading exceeding a threshold or receiving user input. The initial heading is recomputed based on additional rate measurements taken at different rotation angles of the rotatable assembly.

In one embodiment, the first heading is computed by projecting the first and second rate measurements to the tangent plane of the Earth to obtain tangent plane data. The tangent plane data is then fitted to a conic and constrained to a circle. The tangent plane data is projected through the circle transform to obtain transformed data. The transformed data is projected to a polynomial in the tangent plane. The tangent plane angles of the vehicle with respect to a reference direction are calculated. Then zero-crossing of the tangent plane angles is detected by interpolating the rotation angles of the rotatable assembly to obtain the initial heading.

DETAILED DESCRIPTION OF INVENTION

Embodiments of the invention relate to a system and method for more accurately and robustly determining the heading of a vehicle by taking measurements of angle rates by rate sensors mounted on a movable mechanical assembly. In a quasi-static state of the vehicle, the mechanical assembly is rotated around axes perpendicular to the tangent plane of the Earth, and angle rates are measured by the rate sensors at different rotational angles of the mechanical assembly. The measurements of the angle rates are then computed to determine the initial heading of the vehicle relative to a true north of the Earth in the quasi-static state of the vehicle. After determining the initial heading, navigation state propagation is performed to determine the heading of the vehicle in a dynamic state of the vehicle. By taking measurements of the rate sensors at different rotation angles of the mechanical assembly and performing computation based on the measurements, the heading of the vehicle relative to the Earth's true north can be determined using rate sensors less accurate than conventional Ring-Laser Gyro (RLG) or Fiber Optic Gyro (FOG) sensors.

Overview of System Architecture

Figure 1:
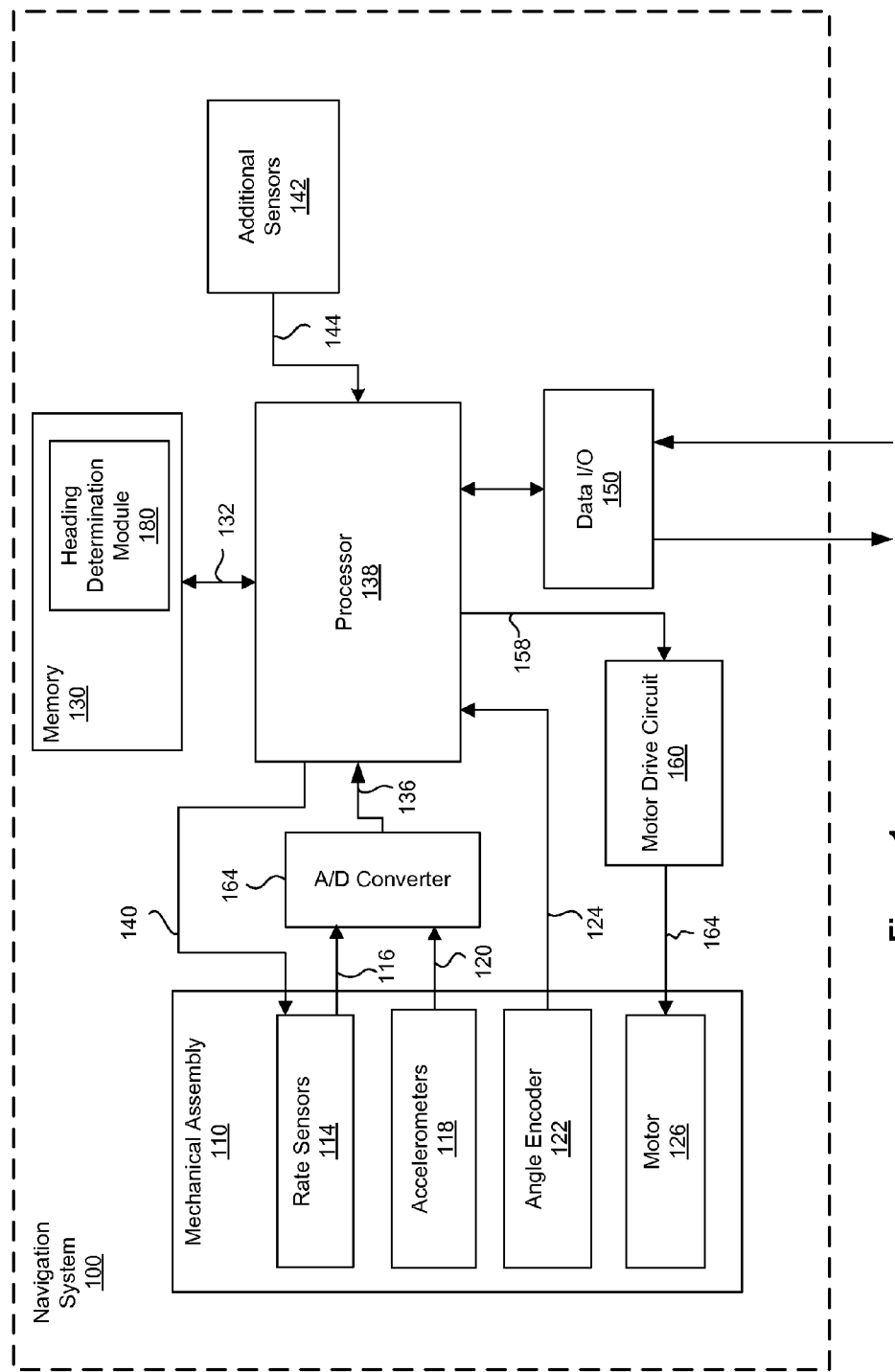
FIG. 1 is a schematic block diagram of a navigation system in accordance with one embodiment.

FIG. 1 is a schematic block diagram of a navigation system 100 in accordance with one embodiment. The navigation system 100 may include, among other components, a mechanical assembly 110, an analog-to-digital (A/D) converter 164, memory 130, a processor 138, additional sensors 142, a motor drive circuit 160, and a serial data input/output (I/O) 150. One or more of these components may be omitted or combined with other components of the navigation system 100. Further, additional components may be provided in the navigation system 100.

The mechanical assembly 110 may include, among other components, rate sensors 114, accelerometers 118, an angle encoder and a motor 126. In one embodiment, the angular rates sensors 114 are Micro-Electro-Mechanical Systems (MEMS) angular rate sensors such as CRS-09 available from Silicon Sensing Systems Ltd. of Plymouth, UK. The MEMS angular rate sensors may be orthogonally mounted to sense angular rates in different directions. The MEMS angular rate sensors may be low-cost and small but also inaccurate compared to mechanical RLG or FOG sensors. In most cases, the MEMS angular rate sensors are not sufficiently accurate to measure the Earth rotational rate vector representing the speed and direction of Earth's rotation by taking a single measurement. Embodiments disclosed herein determine the heading of the vehicle using such MEMS angular rate sensors by taking multiple measurements of the angular rates at different rotational angles of the mechanical assembly, and then computing the measurements, as described below in detail with reference to FIG. 4.

In one embodiment, the MEMS rate sensors include a gain/filter circuit that is controlled by the processor 138 to adjust the gain and bandwidth of the analog rate measurements 116. The analog rate measurements 116 are converted to digital signals 136 and fed to the processor 138. Alternatively, the rate sensors 114 may generate digital rate measurements that can be fed directly to the processor 138.

In one embodiment, the accelerometers 118 include three MEMS accelerometers that are orthogonally mounted. As the mechanical assembly 110 rotates, the accelerometers 118 are also rotated. The accelerometers 118 output analog acceleration measurements 120 that are converted to the digital signals 136 and fed to the processor 138. Alternatively, the accelerometers 118 may generate digital acceleration measurements that can be fed directly to the processor 138.

The mechanical assembly 110 may include a mechanical servo platform (not shown) that is rotated by the motor 126. The rate sensors 114 and the accelerometers 118 may be secured to the mechanical servo platform so that these sensors 114, 118 rotate together with the mechanical servo platform. The mechanical servo platform is configured to rotate about an axis perpendicular to the tangent plane of the Earth. The entire navigation system may be physically leveled before beginning the initial static heading determination. This may be desirable for other reasons as well, such as for stability of a ballistic launcher mounted on a tripod. Alternatively, additional servo motors may be incorporated into the mechanical servo platform to rotate in the non-perpendicular axes before beginning the initial state heading determination. The motor 126 may be a stepper motor coupled to the mechanical servo platform to rotate the mechanical server platform by a predetermined angle.

The motor driver circuit 160 receives a command 158 from the processor 138 and generates a driving signal 164 to rotate the motor 126. The rotation angle of the mechanical servo platform is measured by the angle encoder 122. In one embodiment, the motor driver circuit 160 includes a transistor H-bridge and control logic to prevent shorting of motor windings. For example, A3967 microstepping driver with translator available from Allegro MicroSystems, Inc. of Worcestor, Mass. may be employed as the motor driver circuit 160.

Mechanisms other then the combination of the motor 126 and the motor drive circuit 160 may be used to move the mechanical servo platform. For example, pneumatic actuators or hydraulic cylinders may be used to move the mechanical servo platform. Further, the movement of the mechanical servo platform need not be pure rotation. That is, the movement of the mechanical servo platform may be a combination of linear motion and rotational motion.

The angle encoder 122 generates a digital angle signal 124 that is fed to the processor 138. In one embodiment, a feedback control loop may be implemented using the motor driver circuit 160 and the angle encoder 122 to more accurately control the rotation angle of the mechanical servo platform. In another embodiment, motion sensors other than the angle encoder 122 are employed to measure rotation and/or linear motion of the mechanical assembly 110.

In one embodiment, the mechanical assembly 110 includes a locking device (not shown) that prevents unintended rotation of the mechanical servo platform during dynamic system operation. By locking the mechanical servo platform, the heading of the navigation system 100 remains fixed relative to the body of the vehicle in a dynamic state.

The A/D converter 164 converts the analog sensor signals into digital signals for processing at the processor 138. In one embodiment, the A/D converter 164 is capable of 24-bit quantization or higher resolution. For example, LTC2440 delta-signal converter available from Linear Technology of Milpitas, Calif. may be used as the A/D converter 164. In one embodiment, the A/D converter 164 is coupled to the processor 138 via a Serial Peripheral Interface (SPI) bus.

The processor 138 performs various operations including, among others, collecting sensor inputs, providing sensor calibrations, executing navigation algorithms, and communicating navigation state information through the serial data I/O 150. The memory 130 is coupled to the processor 138 to store calibration data, configuration data, and executable code. In one embodiment, the processor 138 is a digital signal processor (DSP) that is capable of 64-bit floating computation to compute a precise navigation state using complex algorithms. In one embodiment, TMS320320C6713 available from Texas Instruments, Inc. of Dallas, Tex. is employed as the processor 138. The processor 138 also sends commands 140 to the rate sensors 114 to set parameters associated with the rate sensors (e.g., scaling and bandwidth of the angular rate).

The memory 130 is a computer readable storage medium. The memory 130 may be specially constructed for the required purposes, or it may be a general-purpose computer readable storage devices. The memory 130 includes, and is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. The memory 130 includes a heading determination module 180, described below in detail with reference to FIG. 2. In one embodiment, the memory 130 is part of the same integrated circuit that also includes the processor 138. The data 312 between the memory 130 and the processor 138 may be communicated via a bus.

The serial data I/O 150 sends information of navigation states (e.g., roll, pitch and heading) computed by the processor 138 to external devices (e.g., an LCD display such as NL6448BC available from NEC Corporation of Tokyo, Japan) and/or receive user inputs from various input devices. In one embodiment, the serial I/O 150 includes components for embodying Universal Asynchronous Receiver/Transmitter (UART) to provide RS-232C communication between external devices and the processor 138.

The additional sensors 142 are used for correcting the computed navigation state as errors accumulate. The additional sensors 142 may include, but not limited to, GPS (Global Positioning System) sensors, magnetometers, static pressure (altitude) sensor, dynamic pressure (speed) sensor, Doppler velocity sensor, and wheel odometer depending on the application. The additional sensors 142 provide correction signals 144 to the processor 138. In one embodiment, an A/D converter may be provided between the processor 138 and the additional sensors 142 to convert analog sensor signals to digital signals.

In one embodiment, the navigation system 100 is implemented on a rugged and compact enclosure including all the components therein. In another embodiment, the navigation system 100 is implemented on a general purpose computer device coupled with the mechanical assembly 110 and other components.

Components of Heading Determination Module

Figure 2:
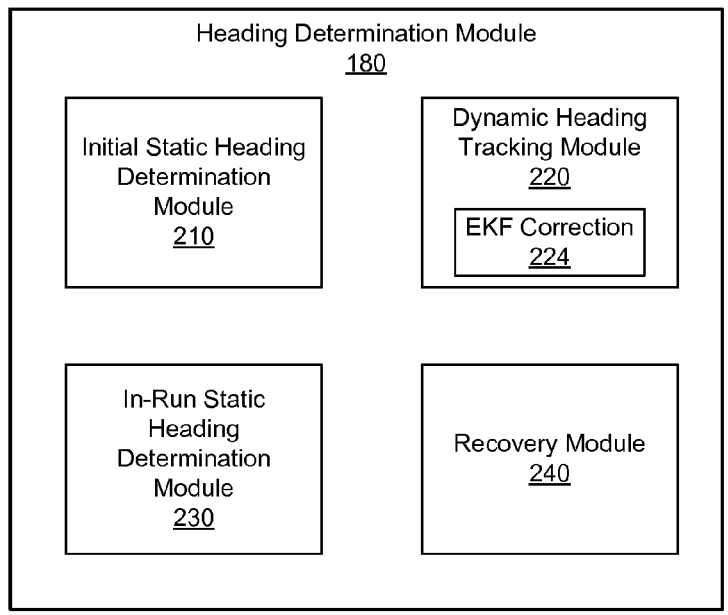
FIG. 2 is a block diagram of software components in the navigation system, in accordance with one embodiment.

FIG. 2 is a block diagram of software components of the heading determination module 180, in accordance with one embodiment. The heading determination module 180 includes, among other software components, an initial static heading determination module 210, a dynamic heading tracking module 220, an in-run static heading determination module 230, and a recovery module 240. One or more of these components may be implemented as hardware, firmware or a combination of software, hardware and firmware. Further, one or more of these components may be combined into a single module or divided into multiple sub-modules.

Figure 4:
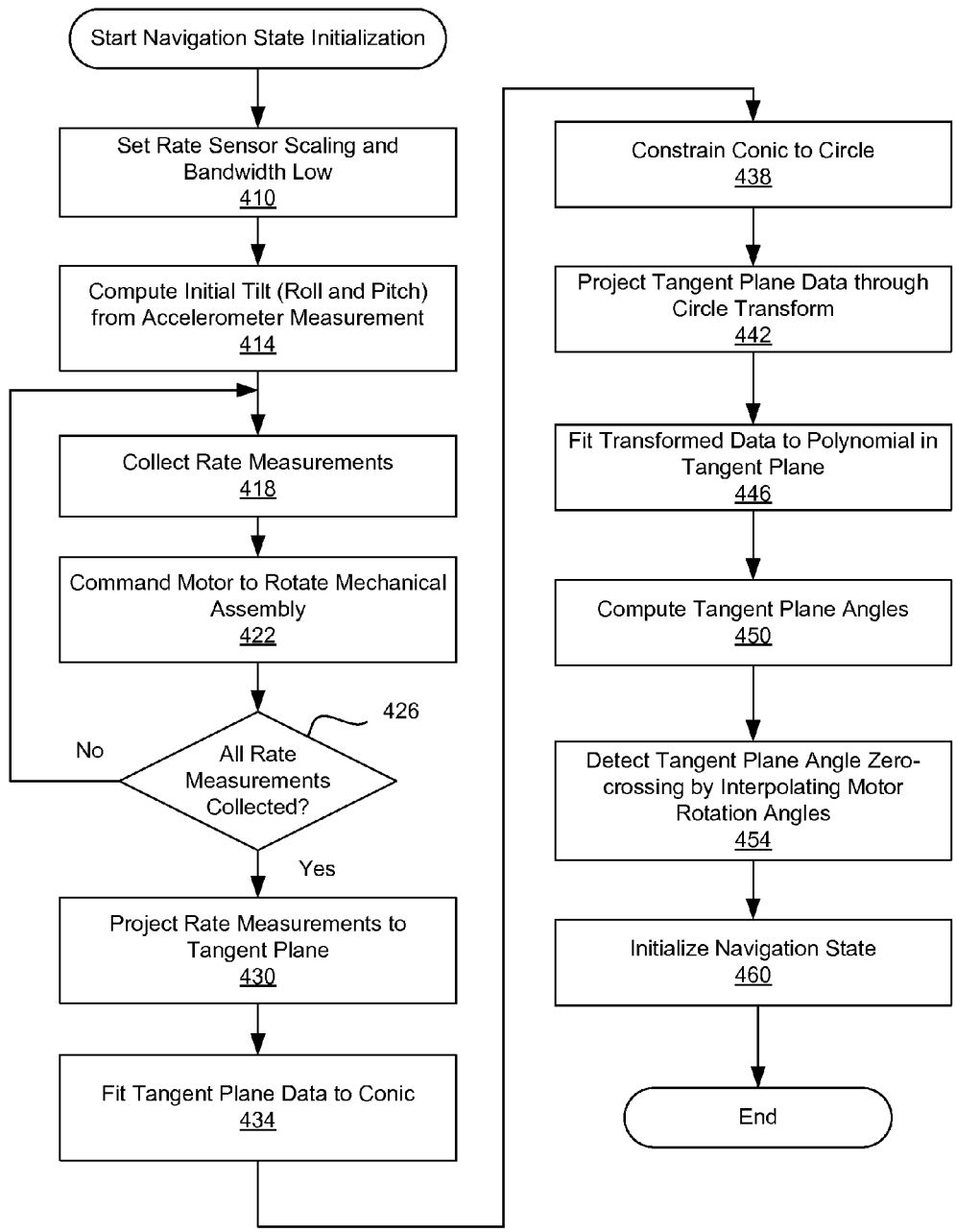
FIG. 4 is a flowchart illustrating a process of initializing navigation state, in accordance with one embodiment.

The initial static heading determination module 210 includes instructions for performing the operation of initializing the navigation state in a quasi-static state, as described below in detail with reference to FIG. 4. The quasi-static state refers to a state of the vehicle where the vehicle moves to a degree but the motion does not result in a net change in the heading of the vehicle. The change of heading during the initialization of the navigation state results in degradation of the initial heading determination, and thus, should be avoided to the extent possible. In one embodiment, the navigation system monitors the rate measurements 116 to determine if the vehicle has remained in the quasi-static state for a sufficient length of time required for initializing the navigation state.

The dynamic heading tracking module 220 includes instructions for performing the operation of tracking the heading of the vehicle in a dynamic state, as described below in detail with reference to FIG. 5. The dynamic state refers to a state of the vehicle where movement of the vehicle results in a net change in the heading of the vehicle. In one embodiment, the dynamic heading tracking module 220 includes an Extended Kalman Filter (EKF) correction module 224 for drift tracking The drift tracking may be used for estimating the accumulated error of the heading in the dynamic state.

The in-run static heading determination module 230 includes instructions for performing in-run static heading determination to improve the performance of the navigation system 100. The in-run static heading determination is substantially the same as the process described below in detail with reference to FIG. 4 except that this process is invoked after performing the dynamic heading tracking. In one embodiment, the in-run static heading determination is initiated by user input received via the data I/O 150 or when the estimated heading error accumulated during the dynamic heading tracking exceeds a predetermined threshold. Before initiating the in-run static heading determination, the vehicle should be placed in a quasi-static state. The in-run static heading determination is concluded when the vehicle remains in the quasi-static state for a sufficient amount of time to collect necessary measurements from the mechanical assembly 110.

The recovery module 240 includes instructions for recovering to dynamic heading tracking if the quasi-static state is breached during the in-run heading determination, as described below in detail with reference to FIG. 6. The recovery module 240 attempts to preserve the navigation state under a dynamic condition while reconfiguring the navigation system 100 for dynamic heading determination.

Overall Process for Determining Heading

Figure 3:
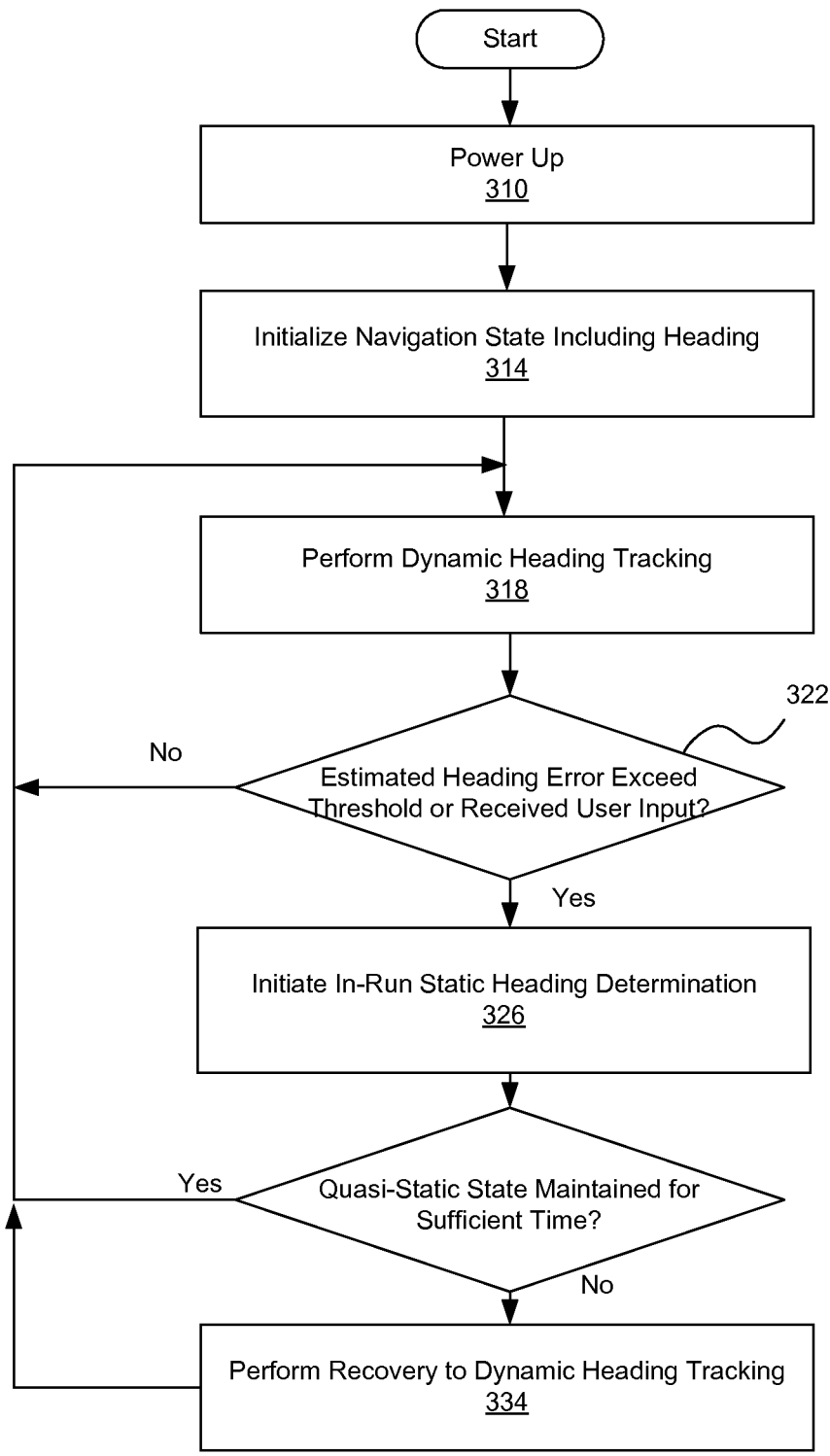
FIG. 3 is a flowchart illustrating an overall process of determining the heading of a vehicle, in accordance with one embodiment.

FIG. 3 is a flowchart illustrating an overall process of determining the heading of a vehicle, in accordance with one embodiment. When the navigation system 100 is powered up 310, the processor 138 and the memory 130 are initialized. Then the initial static heading determination module 210 initializes 314 navigation state (including the heading) of the vehicle while the vehicle remains in a quasi-static state, as described below in detail with reference to FIG. 4.

After initializing the navigation state, the dynamic heading tracking module 220 performs 318 dynamic heading tracking of the vehicle in a dynamic state, as described below in detail with reference to FIG. 5.

If it is determined 322 that the estimated heading error in the dynamic state does not exceed a threshold or user input requesting in-run static heading determination is not received, the process returns to perform 318 the dynamic heading tracking Conversely, if it is determined 322 that the estimated heading error in the dynamic state exceeds the threshold or the user input requesting in-run static heading determination is received, the process proceeds to initiate 326 the in-run static heading determination.

If a quasi-static state is maintained for sufficient time for the in-run static heading determination, the process returns to performing 318 the dynamic heading tracking. If the quasi-static state is interrupted during the in-run static heading determination, the recovery module 240 performs 334 the recovery operation for dynamic heading tracking, as described below in detail with reference to FIG. 6. Then the process returns to performing 318 the dynamic heading tracking Initializing Navigation State Process FIG. 4 is a flowchart illustrating a process of initializing the navigation state of the vehicle, in accordance with one embodiment. The navigation state to be initialized includes, but is not limited to, the heading and the attitude of the vehicle. While the vehicle is in a quasi-static state, the processor 138 sends commands 140 to the rate sensors 114 to reduce the scaling and bandwidth of the sensed angular rate. For example, when using CRS-09 rate sensors, the scaling is reduced to a sensed range of 30 degrees/sec and the bandwidth is reduced to 2 Hz. The reduction in the rate provides greater bias stability in the rate sensors 114. The reduction in bandwidth minimizes noise to allow an accurate statistical sampling of the angular rate measurements in a short period of time.

The initial tilt of the vehicle including the roll and pitch angles of the vehicle is computed 414 based on the acceleration measurements 120 received from the accelerometers 118. In one embodiment, the computation of the roll and pitch angles 414 is performed while the electrical fluctuation in the rate sensors 114 due to setting of the scaling and bandwidth stabilizes.

After setting the rate sensors 114 and computing the tilt, the navigation system 100 is ready to repeat the process of collecting angular rate measurements from the rate sensors 114. At current rotation angle of the mechanical assembly 110, the rate measurements 116 from the rate sensors 114 are collected 418. Then the motor 126 is controlled by the motor drive circuit 160 and the processor 138 to rotate the mechanical assembly 110 for a predetermined angle. In one embodiment, the predetermined angle of rotation is 15 degrees. The gain and bandwidth of rate sensors 114 may be reset after each rotation of the mechanical assembly 110 to minimize filtering of transient response after completion of each motor rotation.

It is determined 426 if the rate measurements 116 are collected for all rotation positions of the mechanical assembly 110 needed to determine the initial heading of the vehicle. If the rate measurements for all required rotation angles of the mechanical servo platform are not collected, then the process returns to collect 418 the rate measurements. The rate sensor measurements 116 are repeatedly collected and averaged until their statistical variance is within the desired accuracy. In one embodiment, collecting 418 the rate measurements 116 and rotating 422 the mechanical assembly 110 are repeated for at least one complete rotation. Depending on the stability characteristics of the rate sensors 114, the rate measurements 116 may be collected across multiple rounds of rotations to improve the accuracy of static heading determination.

If the rate measurements for all required angles are collected, then the process proceeds to project 430 each averaged rate measurement into a local tangent plane using each mechanical rotation angle of the mechanical assembly 110 and the initial tilt. Alternative rotational positioning profiles may also be used to optimize performance. For example, collecting pairs of measurements with one-half rotation of the mechanical assembly 110 between the measurements may improve rate sensor bias determination. Additionally, collecting measurements concentrated near the zero-rate intercept provides maximum angle sensitivity.

The resulting tangent plane angular rate dataset $(p_i, q_i)$, where $p_i$ and $q_i$ are orthogonal data points for all i from the set of tangent plane rate measurements, is fit 434 to a general or specific conic. In one embodiment, a general conic is represented as an implicit second order polynomial expressed in the following equation:

$$F(x,y) = ax^2 + bxy + cy^2 + dx + ey + f = 0 \quad \text{Equation (1)}$$

A numerically-stable quadratically-constrained least squares minimization may be employed with an ellipse-specific constraint $b^2 - 4ac < 0$ to obtain parameters a, b, c, d, e and f representing the tangent plane dataset. The major axes length $m_j$, minor axes length $m_n$, major axes rotation angle $m_\phi$, and center $(m_x, m_y)$ of an ellipse are extracted from the parameters.

The conic fit is then constrained 438 to a circle. The tangent plane angular rate dataset $(p_i, q_i)$ is projected through a linear circular-constraint transform defined as:

$$M = \begin{bmatrix} \cos(m_\phi) & -\sin(m_\phi) \\ \sin(m_\phi) & \cos(m_\phi) \end{bmatrix} \cdot \begin{bmatrix} m_n/m_j & 0 \\ 0 & 1 \end{bmatrix} \cdot \begin{bmatrix} \cos(m_\phi) & \sin(m_\phi) \\ -\sin(m_\phi) & \cos(m_\phi) \end{bmatrix} \quad \text{Equation (2)}$$

The tangent plane dataset is then projected 442 through an affine transform L using the ellipse center and linear circular-constraint where $$L(p_i, q_i) = M \begin{bmatrix} p_i - m_x \\ q_i - m_y \end{bmatrix}.$$

The resulting constrained dataset provides an estimate of a true tangent plane angular rate for each position in the rotation profile.

The constrained dataset pairs are parametrically fit 446 to a polynomial over the platform rotation angle. In one embodiment, a forth order or higher polynomial is fit using a QR-decomposed least-squares approach.

Based on the two polynomial fits resulting from the QR-decomposition, tangent plane angles of the navigation system 100 with respect to true north are computed 450. In one embodiment, a discrete set of proposed platform rotation angles, with resolution set below the desired static heading accuracy, is projected through the polynomial fits. The projection through the polynomial fits results in a set of proposed tangent plane angular rate vectors $(\hat{p}_i, \hat{q}_i)$.

Proposed north-pointing tangent plane angles are calculated using a two-argument arctangent function atan 2($-\hat{q}_i$, $\hat{p}_i$). The proposed tangent plane angle zero-crossing is detected 454 and the proposed motor angle is interpolated between the two associated motor rotation angles of the closest measurements. The proposed tangent plane angle is the rotation of the mechanical assembly 110 away from the true north. This angle becomes the initial static heading for initializing 460 the navigation state. Then the process of initializing the navigation state ends.

The process for in-run static heading determination is identical to the process of initializing navigation state, as described above with reference to FIG. 4.

Dynamic Heading Tracking Process

Figure 5:
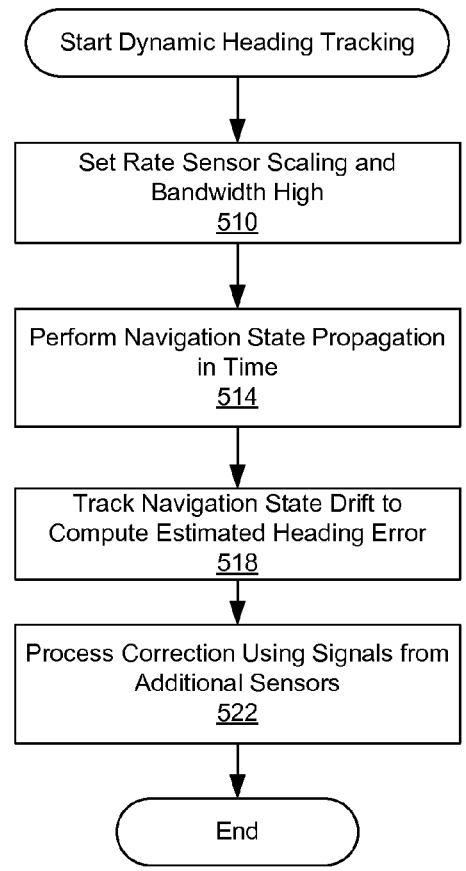
FIG. 5 is a flowchart illustrating a process of dynamically tracking the heading of a vehicle, in accordance with one embodiment.

FIG. 5 is a flowchart illustrating a process of dynamically tracking the heading of a vehicle, in accordance with one embodiment. After the navigation system 100 completes the navigation state initialization 314, as described above in detail with reference to FIG. 4, the navigation system 100 transitions to dynamic heading tracking 318. First, the processor 138 sends commands 140 to the rate sensors 114 to set the rate sensors 114 for high scaling and bandwidth.

The navigation system 100 is now prepared for dynamic motion and propagation of navigation state in time. In the dynamic tracking, arbitrary motions of the vehicle in six degrees of freedom (DOF) are allowed and standard 6-DOF inertial trajectory propagation is employed by the dynamic heading tracking module 220. In one embodiment, an attitude quaternion $Qbt=[q_0\ q_1\ q_2\ q_3]^T$ is employed to provide numerical stability to the computation process. Based on the attitude quaternion Qbt, the navigation state time propagation can be expressed as:

$$\overset{*}{Qbt} = 0.5\begin{bmatrix} 0 & -p & -q & -r \\ p & 0 & r & -q \\ q & -r & 0 & p \\ r & q & -p & 0 \end{bmatrix} \quad \text{Equation (3)}$$

where $[p\ q\ r]^T$ is a bias corrected angular rate vector. The dynamic heading tracking module 220 performs 514 navigation state propagation in time using equation (3).

Based on characteristics of the rate sensors 114 such as noise, bias stability, and random walk, navigation state drift is tracked 518 to compute an estimation of the accumulated heading error. In one embodiment, earth rate corrections are applied to the navigation state time propagation to account for the real angular rotation of the Earth at the location of inertial sensors. The EKF correction module 224 may track drift using an Extended Kalman Filter (EKF) state covariance P using discrete-time form defined by the following equations (4) and (5):

$$P(t+\Delta t)=P(t)+\dot{P}\Delta t \quad \text{Equation (4)}$$

$$\dot{P}=AP+PA^T+Q \quad \text{Equation (5)}$$

where Q is system process noise and represents the covariance of an additive zero-mean white Gaussian random variable for particular sensor characteristics, and A represents state transition Jacobian. The state transition Jacobian A may contain, among others, quaternion partial state Jacobian Qb which is defined as follow:

$$Qb = \begin{bmatrix} q_1 & q_2 & q_3 \\ -q_0 & q_3 & -q_2 \\ -q_3 & -q_0 & q_1 \\ q_2 & -q_1 & -q_0 \end{bmatrix} \quad \text{Equation (6)}$$

In one embodiment, the dynamic heading tracking module 220 receives the correction signals 144 from the additional sensors 142. Based on the correction signals, the EKF correction module 224 processes 522 corrections. The navigation state (including the heading of the vehicle) computed by the dynamic heading tracking module 220 may be provided to the user via the serial data I/O 150.

Setting 510 of the rate sensors 114 through processing 522 of the corrections complete one iteration loop of the dynamic heading tracking. As illustrate in FIG. 3, the navigation system 100 repeats the process illustrated in FIG. 5 until the estimated heading error exceeds a threshold or user input requesting in-run static heading determination is received.

Recovery to Dynamic Heading Tracking

Referring to FIG. 2, if the estimated heading error exceeds a threshold or user input requesting in-run static heading determination is received, the dynamic heading tracking is terminated and in-run static heading determination is initiated 326. Referring back to FIG. 2, in-run static heading determination may be interrupted if the navigation system 100 does not remain quasi-static for a sufficient time. In such case, the process 334 of recovering to the dynamic heading determination may be initiated. By performing recovery process, dynamic heading determination can be continued without completing the in-run static heading determination.

Figure 6:
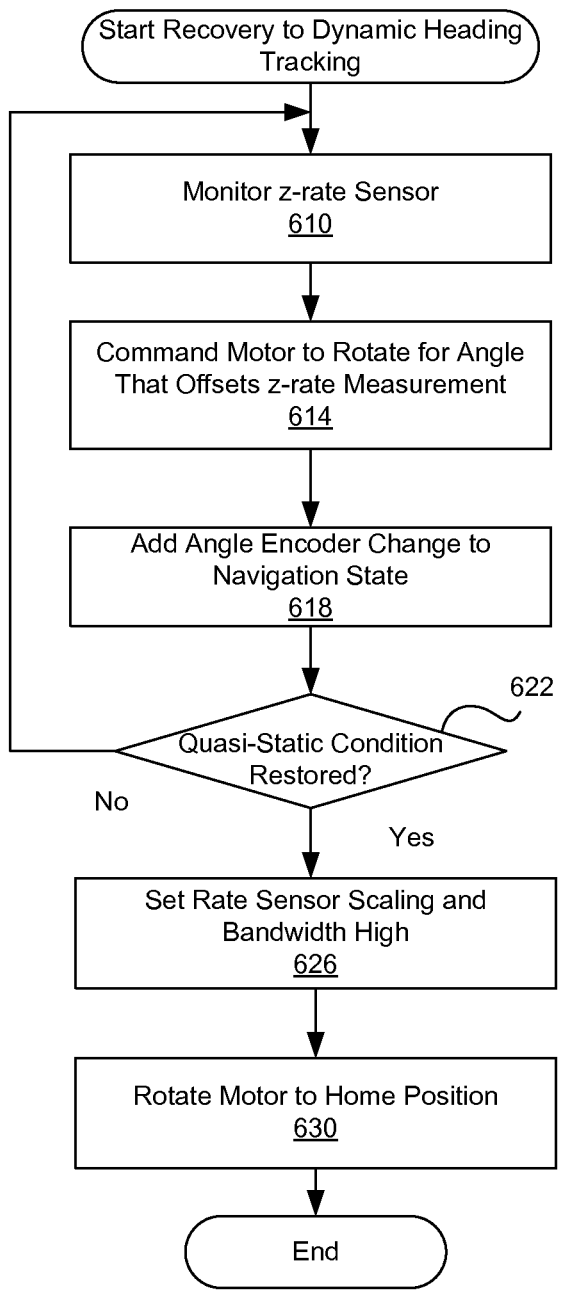
FIG. 6 is a flowchart illustrating a process of recovering to dynamic heading tracking, according to one embodiment.

FIG. 6 is a flowchart illustrating a process of recovering to the dynamic heading tracking, according to one embodiment. First, the recovery module 240 monitors 610 a z-rate sensor. The z-rate sensor is a rate sensor having its sensitive axes aligned perpendicular to the tangent plane of the Earth.

The processor 138 then commands 614 the motor 126 to rotate the mechanical servo platform at a rate that offsets the rate measurement detected by the z-rate sensor using real-time closed loop control to avoid exceeding the measurable range of the z-rate sensor. The rotational changes commanded to the motor 126 are detected by the angle encoder 122. The change in the angle that offsets the rate measurement is then added 618 to the navigation state.

It is then determined 622 if the quasi-static condition is restored by monitoring the peak angular rate detected. If not, the process returns to monitor 610 the z-rate sensor, command the motor 126 to rotate 614, and add 618 the angle encoder change to the modified navigation state obtained in the previous iteration.

If the quasi-static condition of the navigation system 100 is restored, then the rate sensor scaling and bandwidth is set 626 high. Also, the motor 126 is rotated to its home position. The motor 126 may be locked after returning to its home position before returning to the dynamic heading tracking.

In one embodiment, the process of determining the initial heading of the vehicle in a quasi-static state and subsequent heading of the vehicle in the dynamic state, as described above in detail with reference to FIGS. 4 and 5, is used in conjunction with other method of determining the heading of the vehicle such as magnetometers. The results from the navigation system 100 and other sources of heading information may be combined to produce more accurate and enhanced heading information especially during long periods of dynamic heading tracking.

What is claimed is:

1. A computer-implemented method for estimating heading of a vehicle, comprising:
    receiving first angular rate measurements from a plurality of rate sensors mounted on a rotatable assembly at a first time, the rotatable assembly rotated to a first rotation angle and the vehicle having first heading at the first time;
    receiving second angular rate measurements from the plurality of rate sensors at a second time subsequent to the first time, the rotatable assembly rotated to a second rotation angle, the vehicle having second heading that is substantially the same as the first heading at the second time;
    computing the first heading relative to a reference vector representing rotation of the Earth based on the first angular rate measurements and the second angular rate measurements; and
    computing a third heading of the vehicle at a third time subsequent to the second time based on the first heading responsive to receiving third angular rate measurements from the plurality of rate sensors;
    wherein computing the first heading comprises:
        projecting the first and second rate measurements to a tangent plane of the Earth to obtain tangent plane data;
        fitting the tangent plane data to a conic;
        constraining the conic to a circle to obtain a circle transform;
        projecting the tangent plane data through the circle transform to obtain transformed data;
        fitting the transformed data to a polynomial in the tangent plane;

computing tangent plane angles of the vehicle with respect to a reference direction; and detecting zero-crossing of the tangent plane angles by interpolating a rotation angle of the rotatable assembly to obtain the first heading.

2. The method of claim 1, wherein computing the third heading comprises propagating a state of the vehicle in time based on the first heading with discrete time increments.

3. The method of claim 1, further comprising computing estimated error of the third heading by computing a state covariance of an Extended Kalman Filter based on a parameter representing characteristics of one or more of the plurality of rate sensors.

4. The method of claim 1, further comprising computing fourth heading to replace the first heading responsive to an estimated error of the third heading exceeding a threshold or receiving user input based on additional rate measurements taken at different rotation angles of the rotatable assembly.

5. The method of claim 4, further comprising initiating a recovery process to compute heading based on the first heading responsive to detecting change of heading of the vehicle during taking of the additional rate measurements to compute the fourth heading.

6. The method of claim 1, further comprising receiving additional angular rate measurements at rotation angles of the rotatable assembly different from the first rotation angle and the second rotation angle, the heading of vehicle maintained at the first heading during taking of the additional angular rate measurements, the first heading computed based further on the additional angular rate measurements.

7. The method of claim 1, wherein the third heading is computed based further on a correction signal received from a non-rate sensor.

8. A navigation system for estimating heading of a vehicle, comprising:

an initial static heading determination module configured to:

receive first angular rate measurements from a plurality of rate sensors mounted on a rotatable assembly at a first time, the rotatable assembly rotated to a first rotation angle and the vehicle having first heading at the first time;

receive second angular rate measurements from the plurality of rate sensors at a second time subsequent to the first time, the rotatable assembly rotated to a second rotation angle and the vehicle having second heading that is substantially the same as the first heading at the second time; and compute the first heading relative to a reference vector representing rotation of the Earth based on the first angular rate measurements and the second angular rate measurements; and a dynamic heading tracking module configured to compute third heading of the vehicle at a third time subsequent to the second time based on the first heading responsive to receiving third angular rate measurements from the plurality of rate sensors;

wherein the initial static heading determination module is configured to compute the first heading by:

projecting the first and second rate measurements to a tangent plane of the Earth to obtain tangent plane data;

fitting the tangent plane data to a conic;

constraining the conic to a circle to obtain a circle transform;

projecting the tangent plane data through the circle transform to obtain transformed data;

fitting the transformed data to a polynomial in the tangent plane;

computing tangent plane angles of the vehicle with respect to a reference direction; and detecting zero-crossing of the tangent plane angles by interpolating a rotation angle of the rotatable assembly to obtain the first heading.

9. The navigation system of claim 8, wherein the dynamic heading tracking module is configured to compute the third heading by propagating a state of the vehicle in time based on the first heading with discrete time increments.

10. The navigation system of claim 8, wherein the dynamic heading tracking module comprise a correction module configured to estimate an error of the third heading by computing a state covariance of an Extended Kalman Filter based on a parameter representing characteristics of one or more of the plurality of rate sensors.

11. The navigation system of claim 8, further comprising an in-run static heading determination module configure to compute fourth heading to replace the first heading responsive to an estimated error of the third heading exceeding a threshold or receiving user input based on additional rate measurements taken at different rotation angles of the rotatable assembly.

12. The navigation system of claim 11, further comprising a recovery module configured to initiate a recovery process to compute heading based on the first heading responsive to detecting change of heading of the vehicle during taking of the additional rate measurements to compute the fourth heading.

13. The navigation system of claim 8, wherein the initial static heading determination module is further configured to receive additional angular rate measurements at rotation angles of the rotatable assembly different from the first rotation angle and the second rotation angle, the heading of vehicle maintained at the first heading during taking of the additional angular rate measurements, the first heading computed based further on the additional angular rate measurements.

14. The navigation system of claim 8, wherein the dynamic heading tracking module is further configured to compute the third heading based further on a correction signal received from a non-rate sensor.

15. A computer readable storage medium storing instructions thereon, the instructions when executed by a processor in a navigation system for determining heading of a vehicle cause the processor to:

receive first angular rate measurements from a plurality of rate sensors mounted on a rotatable assembly at a first time, the rotatable assembly rotated to a first rotation angle and the vehicle having first heading at the first time;

receive second angular rate measurements from the plurality of rate sensors at a second time subsequent to the first time, the rotatable assembly rotated to a second rotation angle and the vehicle having second heading that is substantially the same as the first heading at the second time;

compute the first heading relative to a reference vector representing rotation of the Earth based on the first angular rate measurements and the second angular rate measurements; and compute third heading of the vehicle at a third time subsequent to the second time based on the first heading responsive to receiving third angular rate measurements from the plurality of rate sensors; and further comprising instructions that cause the processor to:

project the first and second rate measurements to a tangent plane of the Earth to obtain tangent plane data;

fitting the tangent plane data to a conic;

constraining the conic to a circle to obtain a circle transform;

projecting the tangent plane data through the circle transform to obtain transformed data;

fitting the transformed data to a polynomial in the tangent plane;

computing tangent plane angles of the vehicle with respect to a reference direction; and detecting zero-crossing of the tangent plane angles by interpolating a rotation angle of the rotatable assembly to obtain the first heading.

16. The computer readable storage medium of claim 15, wherein instructions to compute the third heading comprises instructions to propagate a state of the vehicle in time based on the first heading with discrete time increments.

17. The computer readable storage medium of claim 15, further comprising instructions to compute estimated error of the third heading by computing a state covariance of an Extended Kalman Filter based on a parameter representing characteristics of one or more of the plurality of rate sensors.

* * * * *